(12) United States Patent
Iinuma

(10) Patent No.: US 6,771,985 B1
(45) Date of Patent: Aug. 3, 2004

(54) WIRELESS BASE STATION THAT STAGGERS THE TRANSMISSION OF SYMBOLS TO SPATIALLY MULTIPLEXED MOBILE STATIONS BY A PREDETERMINED TIME THAT IS SHORTER THAN THE SYMBOL PERIOD

(75) Inventor: Toshinori Iinuma, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 56 days.

(21) Appl. No.: 09/714,284

(22) Filed: Nov. 17, 2000

(30) Foreign Application Priority Data

Nov. 19, 1999 (JP) ............................................ 11-330737

(51) Int. Cl.[7] .............................. H04B 1/38; H04J 3/06; H04L 7/00
(52) U.S. Cl. ...................... 455/561; 455/562; 455/502; 455/25; 455/63.4; 370/503; 370/514; 370/534; 370/337; 370/350; 370/280; 375/356
(58) Field of Search ................................. 455/561, 562, 455/446, 447, 13.2, 25, 63.4, 422, 502, 526; 370/280, 330, 337, 336, 342, 347, 350, 441, 442, 503, 512, 514, 517, 534–541; 375/356, 362–368, 145, 219, 220, 295

(56) References Cited

U.S. PATENT DOCUMENTS

| | | | | |
|---|---|---|---|---|
| 5,487,069 A | * | 1/1996 | O'Sullivan et al. | 370/94.3 |
| 5,887,262 A | * | 3/1999 | Willhoff | 455/452 |
| 6,005,854 A | * | 12/1999 | Xu et al. | 370/335 |
| 6,122,260 A | * | 9/2000 | Liu et al. | 370/280 |
| 6,148,041 A | * | 11/2000 | Dent | 375/340 |
| 6,345,188 B1 | * | 2/2002 | Keskitalo et al. | 455/561 |
| 6,563,862 B1 | * | 5/2003 | Knutson et al. | 375/219 |

FOREIGN PATENT DOCUMENTS

| | | |
|---|---|---|
| JP | 06-152487 | 5/1994 |
| JP | 11-275047 | 10/1999 |

* cited by examiner

Primary Examiner—Duc M. Nguyen
(74) Attorney, Agent, or Firm—Arent Fox PLLC

(57) ABSTRACT

When signals for two mobile stations PS-A and PS-B are multiplexed using path division, a clock generating unit 52 generates a clock signal so as to delay the timing for transmitting symbols to the mobile station PS-B by 0.5 symbol periods relative to the transmission of symbols to the mobile station PS-A. If the transmission timing is adjusted in this way, a mobile station that picks up symbols which are spatially multiplexed with the signal for the present mobile station but are intended for another mobile station will not be synchronized with the symbols for the other mobile station. The mobile station will not be able to properly demodulate the symbols for the other mobile station, and so can be prevented from outputtin

5 Claims, 8 Drawing Sheets

(b)

(c)

WIRELESS BASE STATION THAT STAGGERS THE TRANSMISSION OF SYMBOLS TO SPATIALLY MULTIPLEXED MOBILE STATIONS BY A PREDETERMINED TIME THAT IS SHORTER THAN THE SYMBOL PERIOD

BACKGROUND OF THE INVENTION (1) Field of the Invention

The present invention relates to a wireless base station that communicates using an adaptive array method where transmission signals for mobile stations are spatially multiplexed using different directivity patterns.

(2) Description of the Prior Art

To raise transfer efficiency, in recent years digital communication devices have transferred information by modulating a carrier wave using a digital information signal (a baseband signal).

In the field of digital communication, frequency resources are being used ever more efficiently due to improvements in transfer speed and to increases in the number of channels that have been achieved by accommodating a plurality of users on the same frequency through time-division multiplexing. Attention is also being focused on spatial multiplexing methods where a number of channels are provided at the same time on a single frequency through the use of an adaptive array.

Adaptive array methods dynamically form directivity patterns (also called "array antenna patterns") using a plurality of antennas so that radio waves only reach users positioned in certain directions. As one example, suppose that an adaptive array apparatus includes four radio units that are each composed of a transmission circuit, a reception circuit and an antenna. During transmission, the amplitude and phase of the transmission signal sent by each transmission circuit are adjusted. During reception also, the amplitude and phase of the reception signal received by each reception circuit are also adjusted. By doing so, separate directivity patterns for transmission and reception are formed. The use of an adaptive array is described in detail in Japanese in "Adaptive Signal Processing in a Spatial Region and Its Applications" in Denshi Tsushin Gakkai Ronbunshi (Transactions of the Institute of Electronics, Information, and Communication Engineers (IEICE)) Vol. J75-B-II No. 11 November), and so will not be explained here.

A wireless base station that uses an adaptive array forms different directivity patterns for each mobile station and so can simultaneously communicate with a plurality of mobile stations on a single frequency. This technique is sometimes referred to as PDMA (here standing for "Path Division Multiple Access") communication. This is described in detail in Japanese in "Mobile Communication using PDMA (Path Division Multiple Access)" in Shingaku Giho (Communication Studies) RCS 93-84 (1994-01), pp37–44, and so will not be explained here.

A wireless base station that uses an adaptive array forms different directivity patterns to make effective use of single frequencies. However, when mobile stations that have been assigned the same frequency approach one another, each mobile station will also pick up signals that the wireless base station sends to the other mobile station. FIG. 1 shows an example where a mobile station picks up signals that the wireless base station transmits to another mobile station. In FIG. 1, the symbols "PS-A" to "PS-D" represent mobile stations that are all assigned the same frequency. The ovals 31 to 34 drawn using solid lines represent the directivity patterns of the communication channels that are respectively directed towards the mobile stations PS-A, PS-B, PS-C, and PS-D. When the mobile station PS-B moves as shown by the arrow a, the mobile station PS-B ends up receiving signals that the wireless base station sends to the mobile station PS-A. As a result, the mobile station PS-B demodulates messages sent to the mobile station PS-A from these signals and outputs meaningless noise (similar to the noise made by a computer modem).

This is because the wireless base station performs a secret scrambling process on each signal sent to a mobile station. This scrambling process uses a unique secret key code of the mobile station to prevent other mobile stations from descrambling the signal.

As a result, each mobile station can only descramble the signals that are sent to it by the wireless base station. When a mobile station tries to descramble a signal sent to another mobile station, the secret key code of the mobile station does not match the key code that was used to scramble the signal, so that the descrambling produces a garbled, meaningless message. The mobile station outputs this message as noise. Such noise is annoying for users and so should not be outputted.

To stop mobile stations from outputting such noise, a signal frequency analyzing technique could be used to analyze signals before output by the speaker of a mobile station to detect whether the signals are for voice communication or are simply noise. When the signals are simply noise, the speaker could then be prevented from outputting the signals.

To perform this technique perfectly, however, is very difficult. There is also the problem of having to equip every mobile station with an analyzing means, which complicates the construction of mobile stations.

SUMMARY OF THE INVENTION

In view of the stated problems, it is an object of the present invention to provide a wireless base station that transmits signals in such a way that a mobile station that picks up a path-multiplexed signal intended for another mobile station does not output noise due to this signal, without the mobile station needing to be provided with any additional functions.

The stated object can be achieved by a wireless base station that uses an adaptive array antenna, including: a timing adjustment unit for adjusting a timing at which symbols are transmitted to at least one mobile station, out of a plurality of mobile stations, so that transmissions of symbols to different mobile stations are separated by a period that is shorter than one symbol period; and a multiplexing unit for spatially multiplexing symbols that are transmitted to the plurality of mobile stations using the adjusted timing, the symbols for each mobile station being transmitted using a different directivity pattern to symbols for other mobile stations.

With the stated construction, the wireless base station staggers the transmission timing of symbols for mobile stations that are path multiplexed by a predetermined amount that is less than one symbol period. As a result, when a mobile station receives a signal that is intended for another mobile station, the synch clock required to obtain the symbol data for the other signal differs from the synch clock used for the symbol data send to the mobile station. This prevents the mobile station from properly demodulating symbols that are intended for another mobile station. In this way, mobile stations can be prevented from outputting meaningless noise.

Here, the timing adjustment unit may adjust the timing for transmitting symbols to n mobile stations so that a symbol for a $k^{th}$ mobile station is delayed with respect to a predetermined point in a timeslot by a time equal to $(k/n)\cdot T$, where $k=0, 1, 2, \ldots, n-1$ and T is a length of a symbol period.

With the stated construction, a wireless base station adjusts the timing at which symbols are transmitted to mobile stations located in similar directions so that there is the longest possible intervals between transmissions. This prevents mobile stations from correctly demodulating symbols intended for other mobile stations due to these symbols being transmitted with similar timing to the symbols that are intended for the mobile station.

Here, the wireless base station may further include: a multiplexed number judging unit for judging whether a number of mobile stations for which signals are spatially multiplexed is equal to or greater than a predetermined number, wherein when the number of mobile stations is equal to or above the predetermined number, the timing adjustment unit may adjust a timing at which symbols are transmitted certain mobile stations, out of the mobile stations for which signals are spatially multiplexed, so that transmissions of symbols to the certain mobile stations are separated by a period that is shorter than one symbol period, and when the number of mobile stations is below the predetermined number, the timing adjustment unit may adjust a timing at which symbols are transmitted to all the mobile stations for which signals are spatially multiplexed so that transmissions of symbols are separated by a period that is shorter than one symbol period.

When spatial multiplexing is performed for a large number of signals and the transmission timing is adjusted for every mobile station, the timing at which symbols are transmitted to different mobile stations becomes close, increasing the likelihood of a mobile station correctly demodulating symbols intended for other mobile stations. With the stated construction, however, transmission timing is only adjusted for symbols sent to certain mobile stations, thereby avoiding this problem.

Here, the wireless base station may further include: a direction vector calculating unit for calculating a direction vector from a signal received from a mobile station, the direction vector relating to a direction in which the wireless base station receives a signal from the mobile station, wherein the timing adjustment unit may select, as the certain mobile stations, mobile stations whose direction vectors, which have been calculated by the direction vector calculating means, are similar.

With the stated construction, the transmission timing is adjusted only for mobile stations which, by being positioned in similar directions relative to the wireless base station, are the most likely to mistakenly demodulate symbols intended for other mobile stations.

The stated object can also be achieved by a wireless base station that uses an adaptive array antenna, including: a direction vector calculating unit for calculating, based on a signal received from a mobile station, a direction vector showing a position of the mobile station relative to the wireless base station; a timing adjustment unit for adjusting a timing for transmitting symbols to a plurality of mobile stations that have similar direction vectors so that transmissions of symbols to different mobile stations with similar direction vectors are separated by a period that is shorter than one symbol period; and a multiplexing unit for spatially multiplexing symbols that are transmitted to the plurality of mobile stations using the adjusted timing, the symbols for each mobile station being transmitted using a different directivity pattern to symbols for other mobile stations.

With the stated construction, a wireless base station adjusts the transmission timing for a group of mobile stations that are located in similar directions with respect to the wireless base station. When a large number of mobile stations have their symbols spatially multiplexed together, a mobile station may end up correctly demodulating symbols for another mobile station using its own synch clock. However, the present wireless base station adjusts the timing at which symbols are transmitted to mobile stations that are likely to pick up symbols intended for other mobile stations, and so avoids the situation where symbols are transmitted with similar timings to mobile stations located in similar directions.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT(S)

The following describes an embodiment of the present invention in detail, with reference to the enclosed drawings.

First Embodiment
Overall Construction of the Wireless Base Station

Figure 1:
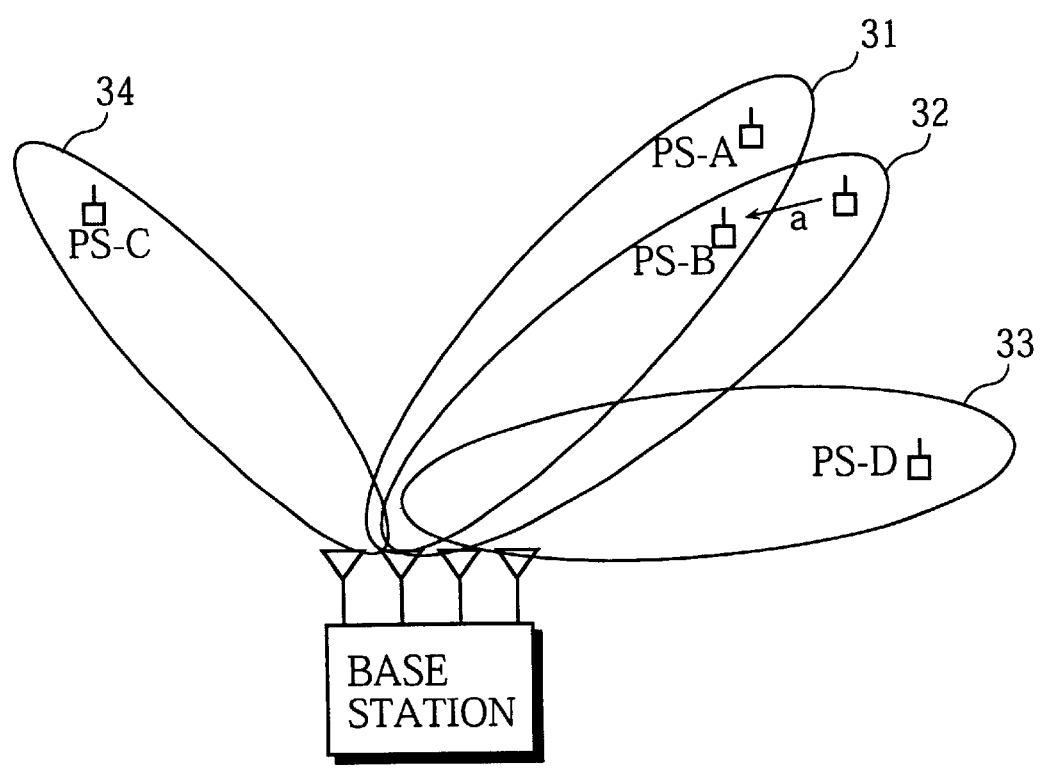
FIG. 1 shows an example of where a mobile station picks up a signal that is sent, to another mobile station.
Figure 2:
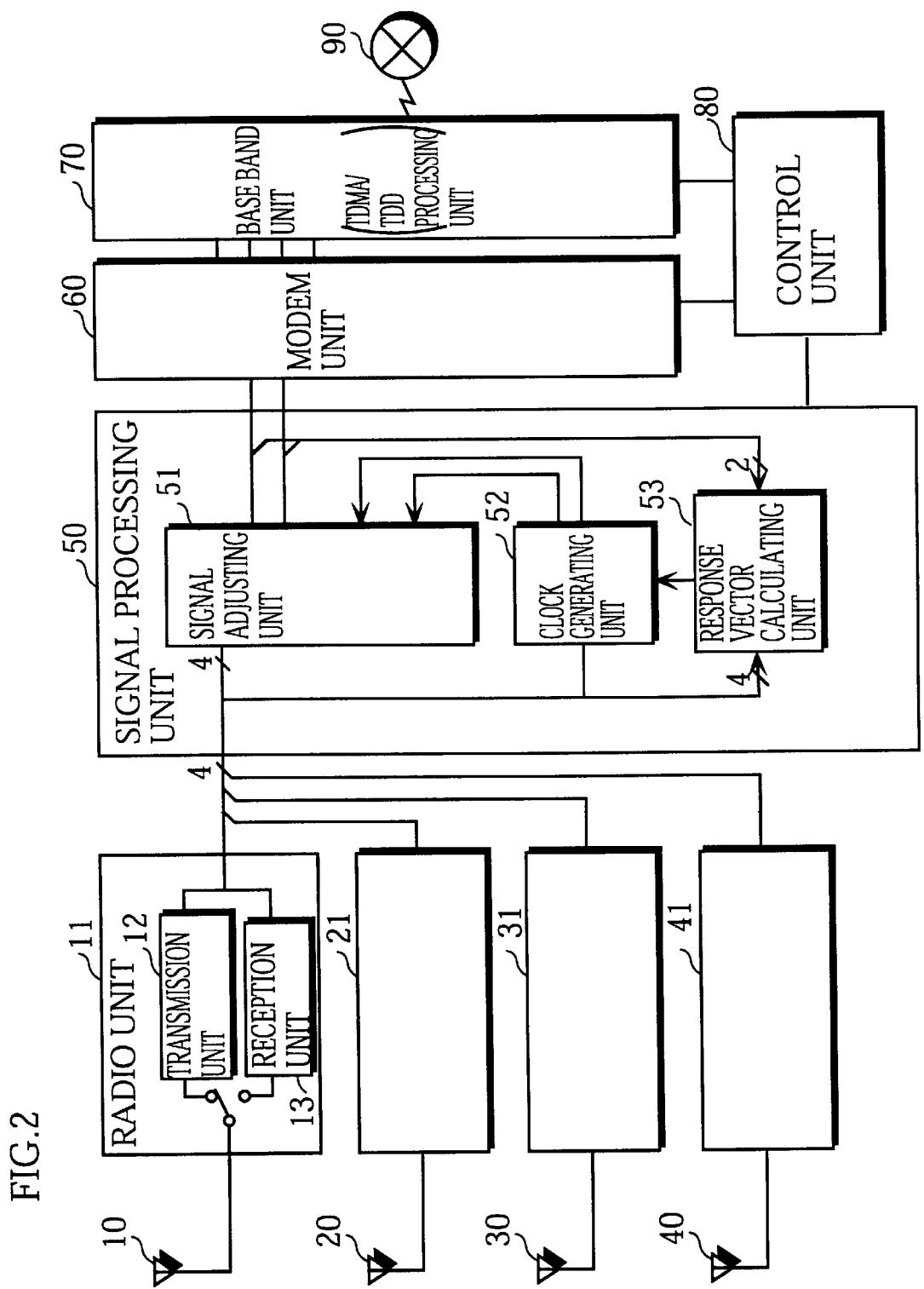
FIG. 2 is a block diagram showing the construction of the main components of a wireless base station in an embodiment of the present invention.

FIG. 2 is a block diagram showing the construction of the main components of a wireless base station that is an embodiment of the present invention.

As shown in FIG. 2, the present wireless base station is composed of radio units 11, 21, 31, and 41, antennas 10, 20, 30, and 40, a modem unit 60, a control unit 80, a baseband unit 70, and signal processing unit 50.

Radio Unit 11

The radio unit 11 is composed of a transmission unit 12 and a reception unit 13. The transmission unit 12 modulates the baseband signal (symbol data) inputted from the signal processing unit 50 to produce an intermediate frequency signal (hereafter, "IF signal"). The radio unit 11 then modulates the IF signal to produce a high-frequency signal (hereafter, "RF signal") which it amplifies to the transmission output level and then outputs to the antenna 10.

The reception unit 13 modulates a received signal inputted from the antenna 10 to produce an IF signal, and then demodulates this IF signal to produce a baseband signal (symbol data).

The radio units 21, 31, and 41 have the same construction as the radio unit 11 and so are not explained.

Modem Unit 60

The modem unit 60 modulates and demodulates baseband signals using an π/4-shift QPSK (Quadrature Phase Shift Keying) method.

Control Unit 80

Figure 3:
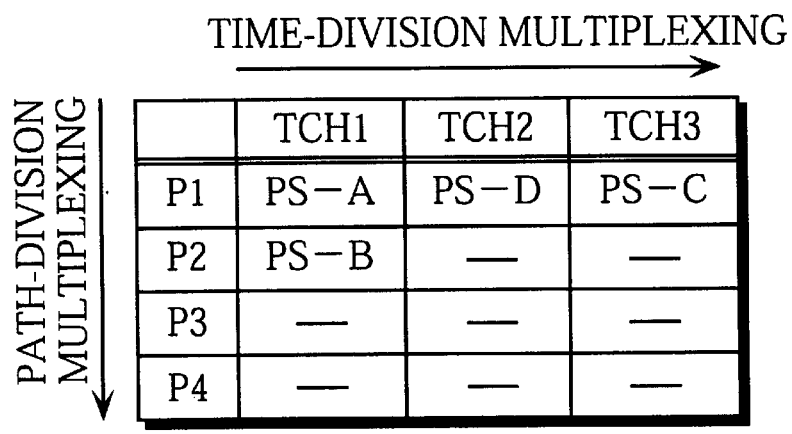
FIG. 3 shows an example of the assignment management table.

The control unit 80 is in fact composed of a CPU (Central Processing Unit) and a memory, and controls the entire wireless base station. In particular, the control unit 80 assigns communication channels when a call is received from a mobile station via a control channel and when a call to a mobile station is received from a communications network. FIG. 3 shows one example of an assignment management table. In the assignment management table in FIG. 3, each column represents a different timeslot for multiplexing signals according to time-division, while each row represents a different channel produced though path division (spatial multiplexing). The legends PS-A to PS-D given in the table represent different mobile stations. In the illustrated case, the signals are transmitted to and from the mobile stations PS-A, PS-C, PS-D in different timeslots according to time division multiplexing, while signals are transmitted to and from the mobile stations PS-A and PS-B in the same timeslot using path division multiplexing.

Baseband Unit 70

The baseband unit 70 is connected to a telephone network 90 that is not illustrated, and transfers baseband signals to and from the telephone network 90.

Figure 4:
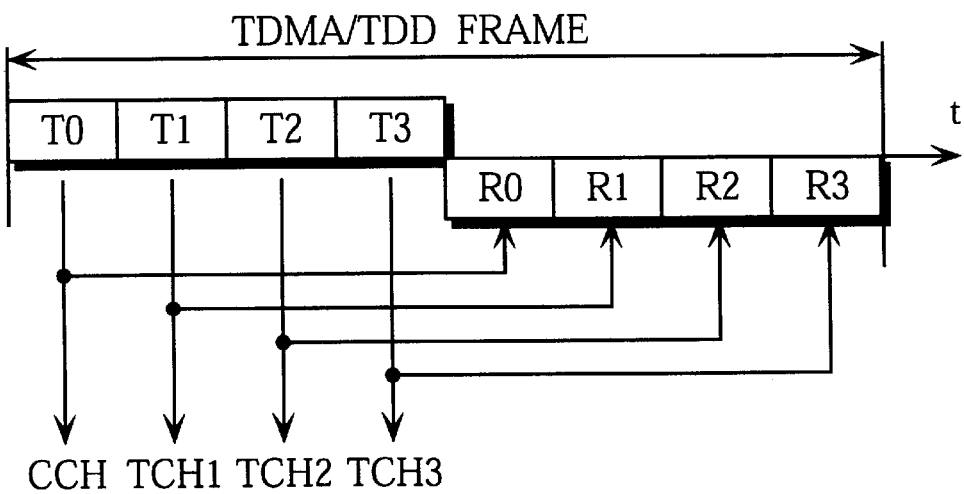
FIG. 4 shows a TDMA/TDD frame that is used to perform time division multiplexing.

The baseband unit 70 also multiplexes signals according to time division. FIG. 4 shows the construction of a TDMA/TDD frame that is used when multiplexing signals according to time division. FIG. 4 shows the example of a TDMA/TDD frame that is used the PHS (Personal Handyphone System) mobile communication system.

In FIG. 4, the legends T0 to T3 show the transmission timeslots, while the legends R0 to R3 show the reception timeslots. The control channel (shown as CCH in FIG. 4) is composed of a pair (T0,R0) of a transmission timeslot and a reception timeslot. The communication channels TCH1, TCH2, and TCH3 are each composed of a pair (respectively (T1,R1) (T2,R2) and (T3,R3)) of a transmission timeslot and a reception timeslot. While the communication channels TCH1, TCH2, and TCH3 are separated according to time division, each of these communication channels can be further divided into a plurality of communication channels through spatial multiplexing.

The baseband unit 70 also performs a secret scrambling process on each baseband signal to be sent to a mobile station (user) using a unique pattern for each mobile station. A signal that has been subjected to this secret scrambling process is descrambled by a mobile station using its unique secret key code. When the secret key code does not match the pattern used to scramble the data, the descrambling process only produces noise.

Signal Processing Unit 50

The signal processing unit 50 is mainly constructed of a programmable digital signal processor (DSP), and includes a signal adjusting unit 51, a clock generating unit 52, and a response vector calculating unit 53.

The clock generating unit 52 generates a unique clock signal for each mobile station (user) whose signals are multiplexed using path division, and sends the resulting clock signals to the signal adjusting unit 51. In the present embodiment, it is assumed that path-division multiplexing is performed for the signals of only two mobile stations, so that the clock generating unit 52 generates a clock signal TA (shown in FIG. 7B) for user A and a clock signal TB (shown in FIG. 7C) for user B.

The clock generating unit 52 normally generates the clock signals TA and TB at the same time. However, when the response vector calculating unit 53 indicates that the transmission timing of symbols should be staggered due to the transmission directions of different users becoming close, the clock generating unit 52 generates the clock signal TB for user B with a timing that is 0.5 symbols ahead or behind the clock signal TA for user A.

The signal adjusting unit 51 generates symbol data for each user from the symbol data inputted from the radio units 11 to 41 and outputs the resulting symbol data to the modem unit 60. The signal adjusting unit 51 also generates symbol data for each of the radio units 11 to 41 from symbol data sent from the modem unit 60 and outputs the resulting symbol data to the radio units 11 to 41.

Figure 5:
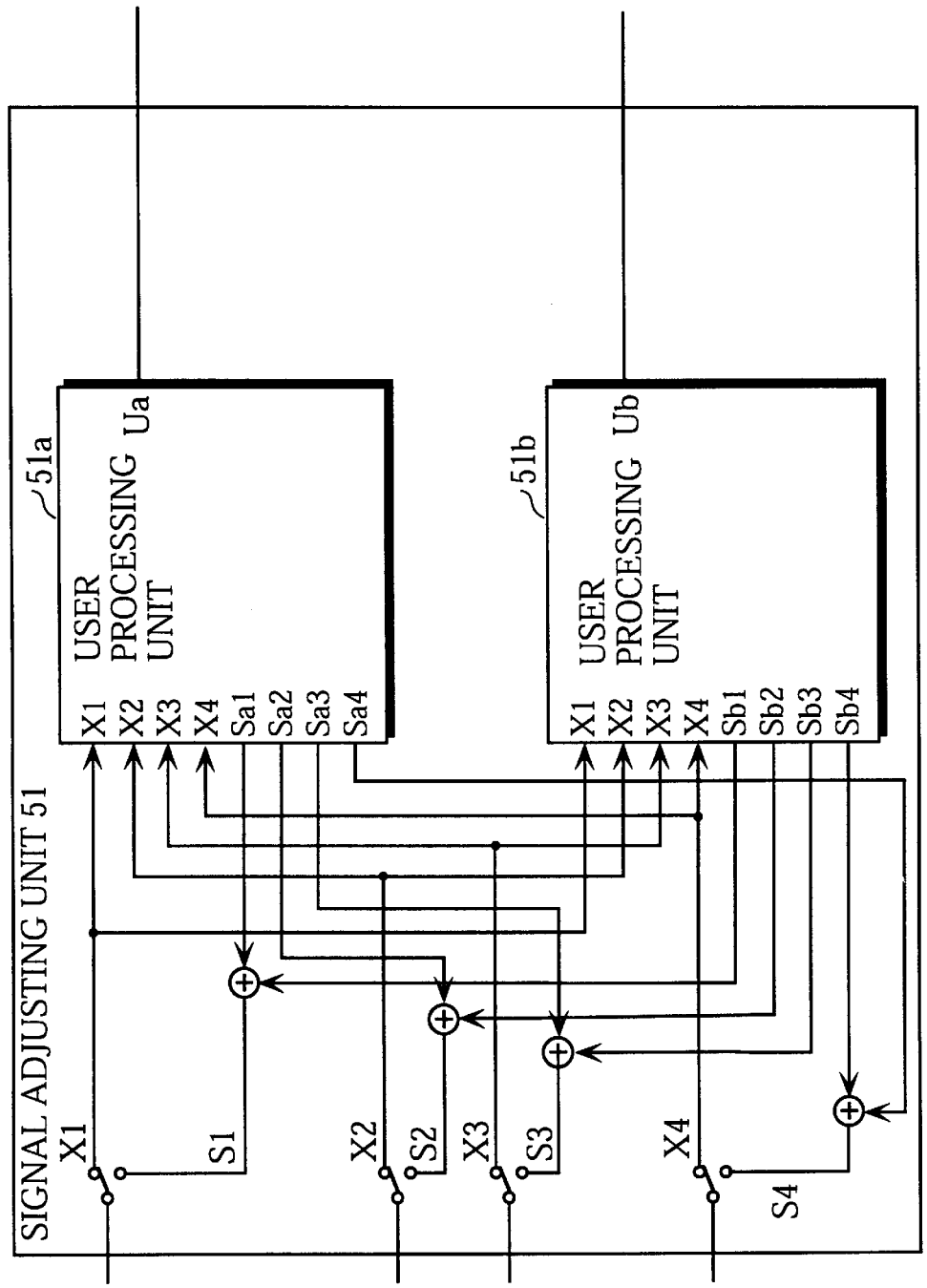
FIG. 5 shows the construction of the signal adjusting unit 51.

FIG. 5 shows the construction of the signal adjusting unit 51. As shown in FIG. 5, the signal adjusting unit 51 includes user processing units 51A and 51B for each user whose signals are spatially multiplexed. The legends X1 to X4 and S1 to S4 in FIG. 5 show signal lines and terminals, though for ease of explanation, these legends are also used as the names of the symbol data inputted and outputted via these signal lines and terminals. X1 to X4 represent the symbol data sent from the radio units 11 to 41 to the signal adjusting unit 51, while S1 to S4 represent the symbol data sent from the signal adjusting unit 51 to the radio units 11 to 41.

The user processing unit 51A receives an input of the symbol data X1 to X4 from the radio units 11 to 41. The user processing unit 51A generates the symbol data Ua for user A from this symbol data X1 to X4, and outputs it to the modem unit 60.

The user processing unit 51A also receives an input of the symbol data Ua for user A from the modem unit 60. The user processing unit 51A generates the symbol data Sa1 to Sa4 for the radio units 11 to 41 from this symbol data Ua and outputs the symbol data Sa1 to Sa4 to the radio units 11 to 41. The user processing unit 51B outputs symbol data Sb1 to Sb4 to the radio units 11 to 41 in the same way. As a result, the radio unit 11, for example, adds the symbol data Sa1 and Sb1 that it receives from the user processing units to produce the symbol data S1 (=Sa1+Sb1) that is transmitted.

Figure 6:
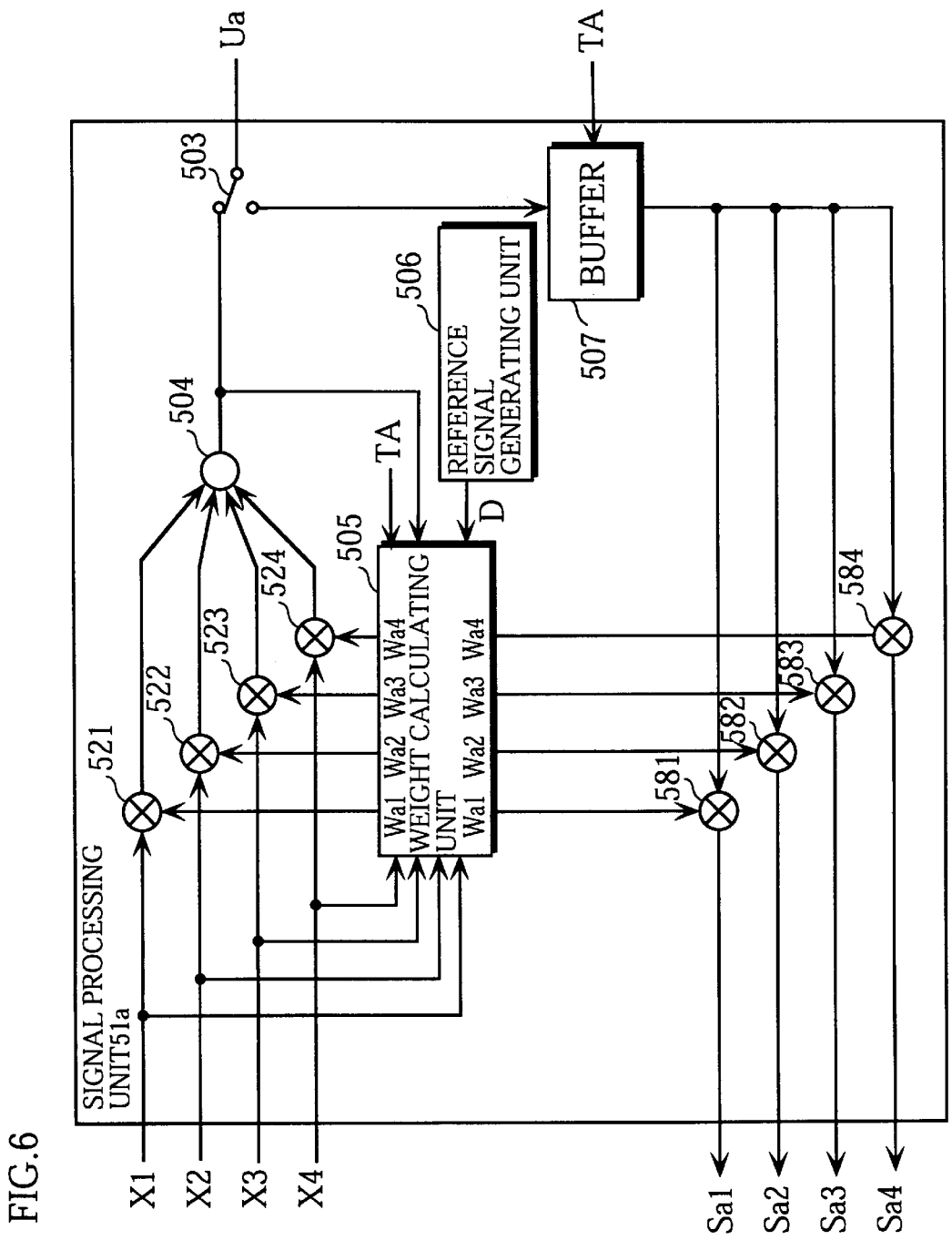
FIG. 6 shows the construction of the user processing unit 51A.

The following describes the processing of each user processing unit in detail. The construction of the user processing unit 51A is shown in FIG. 6.

The weight calculating unit 505 calculates weights using the first few symbols in each reception timeslot. In accordance with the clock signal TA, the weight calculating unit 505 uses the symbol data X1 to X4 that have been sent by the radio units 11 to 41 and the fixed symbol data D that has been sent from the reference signal generating unit 506 to calculate the weights W1 to W4 such that the value E (where $E = D - (Wa1 \cdot X1 + Wa2 \cdot X2 + Wa3 \cdot X3 + Wa4 \cdot X4)$) is minimized.

The weights Wa1 to Wa4 are used when receiving the rest of the symbol data in the reception timeslot and also as the initial values for, the transmission timeslot that is paired with the reception timeslot.

When receiving symbols, the weight calculating unit 505 outputs the calculated weights Wa1 to Wa4 in accordance with the clock signal TA. The multipliers 521 to 524 and the adder 504 also generate symbol data Ua for user A by performing the calculation Ua=Wa1·X1+Wa2·X2+Wa3·X3+ Wa4·X4). The weight calculating unit 505 sends the symbol data Ua for user A generated in this way to the modem unit 60.

When transmitting symbols, the symbol data Ua for user A that has been sent from the modem unit 60 is temporarily stored in the buffer 507. The buffer 507 outputs this symbol data Ua in accordance with the clock signal TA generated by the clock generating unit 52.

The weight calculating unit 505 outputs the weight vectors calculated as described above in accordance with the clock signal TA. The multipliers 581 to 584 multiply the symbol data Ua by the weights Wa1 to Wa4 and output the resulting symbol data Sa1(=Wa1·Ua), Sa2(=Wa2·Ua), Sa3 (=Wa3·Ua), and Sa4(=Wa4·Ua) to the radio units 11 to 41.

The weight calculating unit of the user processing unit 51B calculates weights in accordance with the clock signal TB and outputs the weights when symbol data is received or transmitted. The buffer of the user processing unit 51B outputs the symbol data Ub for user B in accordance with the clock signal TB. When the directions in which user A and user B are positioned relative to the wireless base station become close, the clock generating unit 52 generates the clock signal TB with a timing that is 0.5 symbol periods behind the clock signal TA, so that the symbol data Sb1 to Sb4 outputted by the user processing unit 51B is 0.5 symbol periods behind the symbol data Sa1 to Sa4 outputted by the user processing unit 51A.

Figure 7:
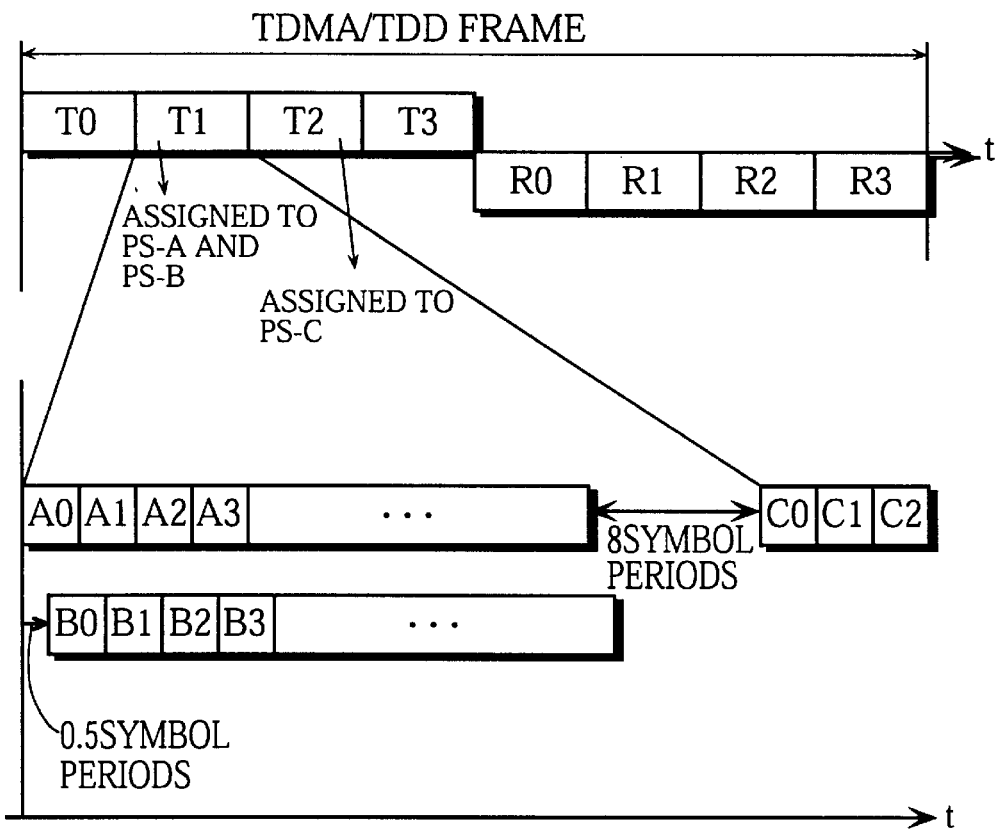
FIG. 7 shows an example of when the symbol data for one user is transmitted with adjusted timing.
Figure 7:
Figure 7:

FIG. 7 shows one example where the symbol data for one user is transmitted having been delayed.

As shown in the drawing, signals for the two mobile stations PS-A (user A) and PS-B (user B) are multiplexed using path division into the same timeslot T1 produced by time division. As the directions in which user A and user B are positioned relative to the wireless base station become close, the clock generating unit 52 sends the clock signal TA to the user processing unit 51A and the clock signal TB, which is 0.5 symbol periods behind the clock signal TA, to the user processing unit 51B.

As a result, the symbol data that is to be sent to each user becomes staggered. In FIG. 7, A0, A1, A2, and A3 represent the symbol data that is to be sent to the mobile station PS-A, while B0, B1, B2, and B3 represent the symbol data that is to be sent to the mobile station PS-B.

When the transmission timing of symbols is adjusted in this way, a mobile station that picks up symbol data that is being sent to another mobile station cannot correctly demodulate the symbol data for the other mobile station since the transmission timing of the symbol data differs from the transmission timing of the symbol data that is being sent to this mobile station. When this kind of demodulating error occurs, the descrambling of the demodulated symbols (an audio signal) is stopped so that meaningless noise is not outputted. In other words, the wireless base station changes the transmission timing of symbols to prevent mobile stations from demodulating transmission signals that are intended for other mobile stations. This is the main characteristic of the present invention.

Response Vector Calculating Unit 53

The response vector calculating unit 53 calculates response vectors that show in which directions the mobile stations are located relative to the wireless base station. These response vectors are calculated from the symbol data inputted into the response vector calculating unit 53 by the radio units 11 to 41. These response vectors are calculated as shown below. The response vector for user A is set as Ra (=$H_{1A}$, $H_{2A}$, $H_{3A}$, $H_{4A}$), the response vector for user B is set as Rb (=$H_{1B}$, $H_{2B}$, $H_{3B}$, $H_{4A}$), and R=(Ra,Rb). From the symbol data X1 to X4 received from the radio units 11 to 41, X=(X1,X2,X3,X4)'.

From the symbol data Ua,Ub calculated by the signal adjusting unit 51, U=(Ua,Ub)'. In this case, a relationship X=RU can be established, and the response vector calculating unit 53 can find the response vectors Ra and Rb for each user using X and. U.

These response vectors include information showing in which direction each user (mobile station) is positioned relative to the wireless base station. When the directions are close, the mobile stations are likely to pick up signals that are being transmitted to other mobile stations, so that when the difference between the directions in which user A and user B are positioned falls to a certain value or below, the response vector calculating unit 53 instructs the clock generating unit 52 to generate the clock signal TB for user B with a delay with respect to the clock signal TA for user A.

The following describes the processing performed by a mobile station when receiving signals that have been transmitted by the wireless base station described above.

Construction of the Mobile Station

Figure 8:
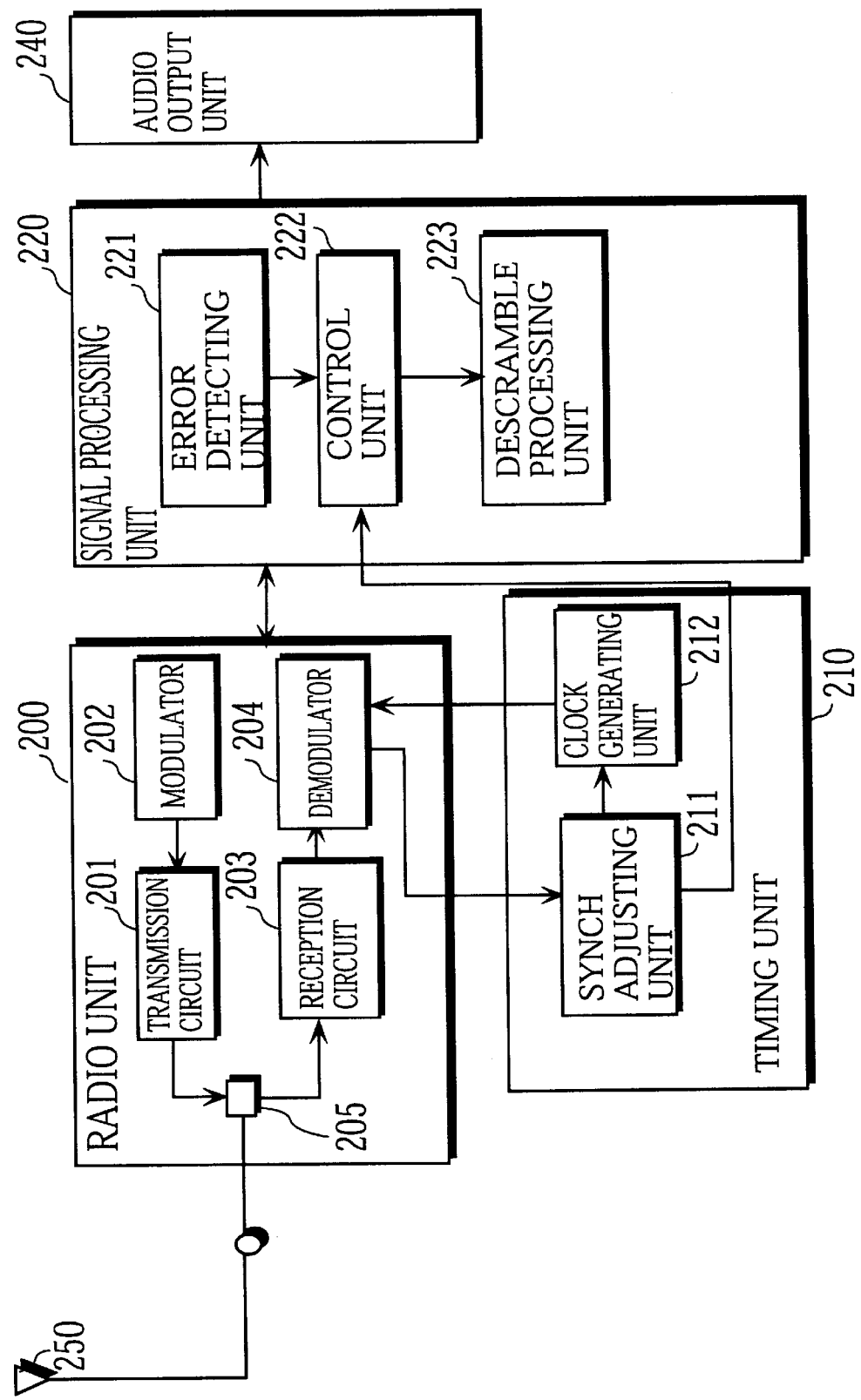
FIG. 8 is a block diagram showing the construction of the main components of a mobile station in an embodiment of the present invention.

FIG. 8 is a block diagram showing the main components of a mobile station in the present embodiment of the present invention.

The mobile station includes a radio unit 200, an antenna 250, a signal processing unit 220, a timing unit 210 and an audio output unit 240.

Radio Unit 200

The radio unit 200 includes a modulator 202, a transmission circuit 201, a switch 205, a reception circuit 203, and a demodulator 204.

Timing Unit 210

The timing unit 210 includes a synch adjusting unit 211 and a clock generating unit 212.

Synch Adjusting Unit 211

The synch adjusting unit 211 adjusts the timing at which a clock signal is generated so that a received and demodulated message sequence matches a predetermined synch word.

Even after adjusting the synchronization in this way, the synch adjusting unit 211 continues to investigate whether the message sequences match the synch word. When a message sequence does not match, the synch adjusting unit 211 performs a readjustment of the synchronization and informs the control unit 222 that synchronization has been lost.

Clock Generating Unit 212

Based on instructions received from the synch adjusting unit 211, the clock generating unit 212 generates a clock signal. The demodulator 204 uses this clock signal when demodulating message sequences.

The following describes an example where the mobile station PS-A is demodulating signals. In this example, signals for the mobile stations PS-A and PS-B are multiplexed together using path division, and the mobile station PS-A picks up the signals that are transmitted to the mobile station PS-B in addition to the signals that are transmitted to it by the wireless base station. As a result, the mobile station mistakenly demodulates the signals that are transmitted to the mobile station PS-B.

Figure 9:
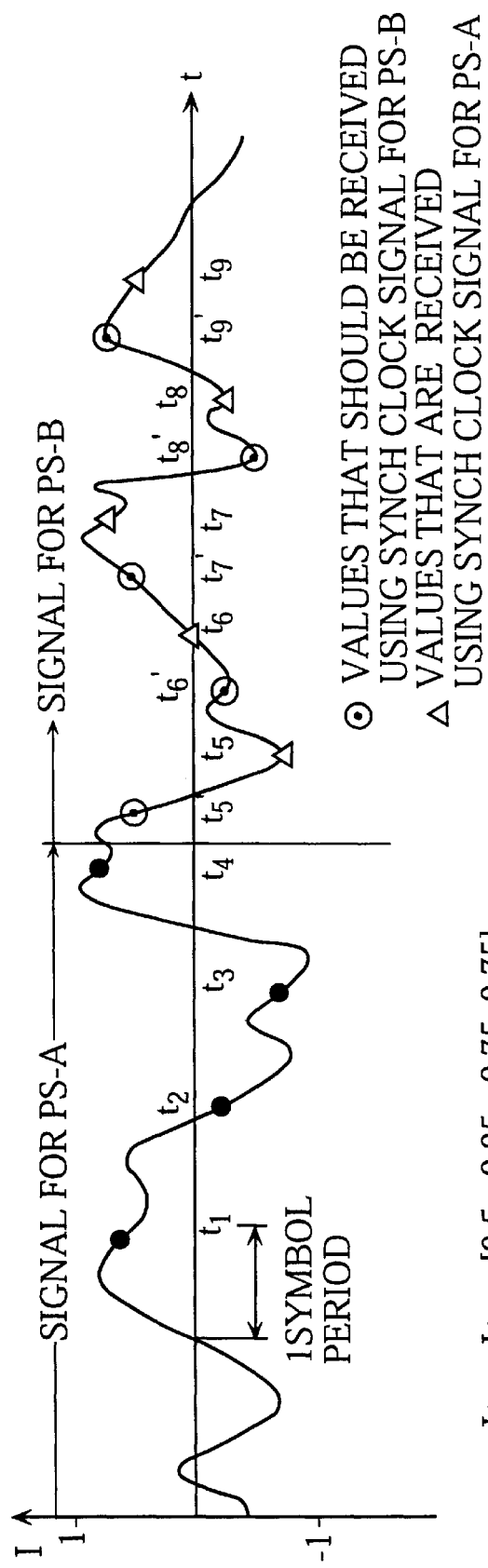
FIG. 9 shows the I components that are detected for synchronization purposes.

The demodulator 204 performs a synchronized detection on the received signals and obtains I components and Q components. FIG. 9 shows the I components produced by this synchronized detection. Although not illustrated, the detected Q components can be depicted in the same way.

The mobile station PS-A generates a synch clock in each symbol period and so obtains $I_k$. The legends $t_1$ to $t_4$ in FIG. 9 show the timing at which the synch clock is generated. The demodulator 204 uses this synch clock to obtain $I_1$ to $I_4$ (={0.5, −0.25, −0.75, 0.75}).

After this, at time $t_M$, the mobile station PS-A reaches a point where the signal strength for the transmission signal of the mobile station PS-B is high. This can be due, for example, to the mobile station PS-A approaching the mobile station PS-B. As a result, there can be cases where the mobile station PS-A receives the signals that the wireless base station transmits to the mobile station PS-B, without receiving the signals transmitted to the PS-A itself.

Despite moving in this way, the mobile station PS-A continues to demodulate signals using the same synch clock. The legends t5 to t9 in FIG. 9 show the timing at which the mobile station PS-A generates the synch clock. The demodulator 204 uses this synch clock to obtain $I_5(F)$ to $I_9(F)$ (={−0.75, 0, 0.75, −0.25, 0.5}).

However, as described above, the signal processing unit 50 of the wireless base station delays the transmission of the symbol data for the mobile station PS-B by 0.5 symbol periods with respect to the symbol data for the mobile station PS-A. This means that the proper signal for the mobile station PS-B is $I_5(T)$ to $I_9(T)$ (={0.5, −0.25, 0.5, −0.5, 0.75}) at the timing shown as t5' to t9'.

As described above, a mobile station obtains the erroneous signal components Ik(F) instead of receiving the proper signal components Ik(T) that are intended for another mobile station. For the same reasons, the mobile station also receives the erroneous signal components Qk(F).

The signal components $I_k$, $Q_k$ and the message sequence are related as follows.

The component ($a_n$, $a_{n+1}$) in the message sequence {$a_1$, $a_2$, ... $a_n$, $a_{n+1}$, ...} correspond to the binary data ($X_k$, $Y_k$). The following relationship is established between the binary data ($X_k$, $Y_k$) and the components $I_k$, $Q_k$.

$I_k = I_{k-1}\cos[\theta(X_k,Y_k)] - Q_{k-1}\sin[\theta(X_k,Y_k)]$ $Q_k = I_{k-1}\sin[\theta(X_k,Y_k)] + Q_{k-1}\cos[\theta(X_k,Y_k)]$ when $\theta = -3\pi/4$ $X_k = 1$, $Y_k = 1$
when $\theta = 3\pi/4$ $X_k = 0$, $Y_k = 1$
when $\theta = \pi/4$ $X_k = 0$, $Y_k = 0$
when $\theta = -\pi/4$ $X_k = 1$, $Y_k = 0$ Based on the above, the binary data ($X_k$, $Y_k$) can be obtained from the signal components $I_k$, $I_{k-1}$, $Q_k$, and $Q_{k-1}$ and the message sequence $a_n$ can be obtained from the binary data ($X_k$, $Y_k$).

As a result, when there is an error in the components $I_k$ and $Q_k$, the resulting message sequence $a_n$ is also erroneous. This results in the demodulated message sequence differing from the synch word, which produces a synchronization error, or, even if the message sequence matches the synch word, in a CRC error.

Signal Processing Unit 220

The signal processing unit 220 includes an error detecting unit 221, a control unit 222, and a descramble processing unit 223.

Error Detecting Unit 221

The error detecting unit 221 performs a CRC check on the message sequence outputted by the radio unit 200 and informs the control unit 222 of the result.

Control Unit 222

When the synch adjusting unit 211 has detected a synchronization error, or when the error detecting unit 221 has detected an error, the control unit 222 has the descramble processing unit 223 stop the descrambling of the message sequence.

Descramble Processing Unit 223

The descramble processing unit 223 descrambles a message sequence received from the radio unit 200. Since a synch error or a CRC error occurs for a message sequence that is intended for other mobile stations, the descramble processing unit 223 is instructed by the control unit 222 to stop the descrambling and so does not descramble the message sequence.

As a result, the descramble processing unit 223 does not descramble message sequences for other mobile stations that do not match the secret key code of the present mobile station.

Audio Output Unit 240

The audio output unit 240 includes a speaker which outputs the message sequence (an audio signal) produced by the descramble processing of the descramble processing unit 223. Since only message sequences that match the secret key code of the present mobile station are descrambled by the descramble processing unit 223, there are no cases where the audio output unit 240 outputs noise due to a message sequence having been descrambled using the wrong secret key.

As described above, the wireless base station of the present embodiment staggers, by an appropriate amount within one symbol period, the timing for the transmission of symbols to mobile stations whose signals are multiplexed using path division. By adjusting the transmission timing in this way, a mobile station can be prevented from outputting noise due to the improper demodulation of symbols that are intended for another mobile station but are picked by the present mobile station.

Note that while the present invention has been described by way of the embodiment given above, it is not limited to the details given therein. Various modifications are possible, with two representative examples being given below.

Modification 1

While the above embodiment describes an adjustment to the transmission timing of signals for two mobile stations whose signals are multiplexed together using path division, this is not a limitation for the present invention. As one example, suppose that multiplexing is being performed using path division for the signals of three mobile stations (PS-1, PS-2, PS-3). In this case, the transmission of symbol data for the mobile stations PS-2 and PS-3 can be respectively delayed by 0.33 and 0.66 symbol periods relative to the transmission of symbol data for the mobile station PS-1. As a result, mobile stations can be prevented from mistakenly demodulating symbol data that is transmitted to other mobile stations.

In the same way, when N signals are being multiplexed using path division, the transmission timing of symbols for different mobile stations can be set at (K/N)·T from a predetermined point in the timeslot, where K=0, 1, 2, ..., N−1 and T is the symbol period.

The delaying of the transmission of symbols does not need to be limited to a single symbol period. As examples, the transmission timing may be delayed by 1 symbol period, by 1.5 symbol periods, or by 2 symbol periods. When the transmission of symbols is delayed by one symbol period, for example, the original symbol data will be demodulated properly by a mobile station, though the content will also be shifted by one symbol period. In other words, if the transmission of the symbols $\{a_0, a_1, a_2, \ldots\}$ is delayed by one symbol period, the mobile station will mistakenly demodulate the symbols as $\{a_1, a_2, a_3, \ldots\}$. As the symbol $a_0$ is skipped, this can result in the message sequence failing to match the synch word or in a CRC error.

Second Modification

The above embodiment was described as adjusting the transmission timing of symbols when two mobile stations with spatially multiplexed signals are positioned in similar directions relative to a wireless base station. However, the transmission timing of spatially multiplexed signals may always be adjusted, regardless of the positioning of the mobile stations.

When a wireless base station has a plurality of antennas and a large number of signals can be spatially multiplexed, the transmission timing of symbols to each mobile station will be similar. This makes it easier for mobile stations to demodulate signals that are intended for other mobile stations. In this case, the following method may be used. The wireless base station may first judge whether the number of signals to be multiplexed using path division is equal to or above a predetermined number. When this is not the case, the wireless base station may adjust the transmission timing for all mobile stations currently in communication. Conversely, when the number of signals being spatially multiplexed is equal to or above a predetermined number, the wireless base station may adjust the transmission timing only for the signals intended for mobile stations that are positioned in similar directions relative to the wireless base station.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A wireless base station that uses an adaptive array antenna, comprising:

timing adjustment means for adjusting a timing at which symbols are transmitted to at least one mobile station, out of a plurality of mobile stations, so that transmissions of symbols to different mobile stations are separated by a period that is shorter than one symbol period; and multiplexing means for spatially multiplexing symbols that are transmitted to the plurality of mobile stations using the adjusted timing, the symbols for each mobile station being transmitted using a different directivity pattern to symbols for other mobile stations.

2. A wireless base station according to claim 1, wherein the timing adjustment means adjust the timing for transmitting symbols to n mobile stations so that a symbol for a $k^{th}$ mobile station is delayed with respect to a predetermined point in a timeslot by a time equal to $(k/n) \cdot T$, where $k=0,1,2,\ldots,n-1$ and T is a length of a symbol period.

3. A wireless base station according to claim 1, further comprising:

multiplexed number judging means for judging whether a number of mobile stations for which signals are spatially multiplexed is equal to or greater than a predetermined number, wherein when the number of mobile stations is equal to or above the predetermined number, the timing adjustment means adjusts a timing at which symbols are transmitted to certain mobile stations, out of the mobile stations for which signals are spatially multiplexed, so that transmissions of symbols to the certain mobile stations are separated by a period that is shorter than one symbol period, and when the number of mobile stations is below the predetermined number, the timing adjustment means adjusts a timing at which symbols are transmitted to all the mobile stations for which signals are spatially multiplexed so that transmissions of symbols are separated by a period that is shorter than one symbol period.

4. A wireless base station according to claim 3, further comprising:

direction vector calculating means for calculating a direction vector from a signal received from a mobile station, the direction vector relating to a direction in which the wireless base station receives a signal from the mobile station, wherein the timing adjustment means selects, as the certain mobile stations, mobile stations whose direction vectors, which have been calculated by the direction vector calculating means, are similar.

5. A wireless base station that uses an adaptive array antenna, comprising:

direction vector calculating means for calculating, based on a signal received from a mobile station, a direction vector showing a position of the mobile station relative to the wireless base station;

timing adjustment means for adjusting a timing for transmitting symbols to a plurality of mobile stations that have similar directions vectors so that transmission of symbols to different mobile stations with similar direction vectors are separated by a period that is shorter than one symbol period; and multiplexing means for spatially multiplexing symbols that are transmitted to the plurality of mobile stations using the adjusted timing, the symbols for each mobile station being transmitted using a different directivity pattern to symbols for other mobile stations.

* * * * *